(12) United States Patent
Stockert et al.

(10) Patent No.: US 12,450,677 B2
(45) Date of Patent: Oct. 21, 2025

(54) SYSTEM AND METHOD FOR QUANTUM DIGITAL TWINNING AND PUBLIC SAFETY MANAGEMENT

(71) Applicants: AT&T Intellectual Property I, L.P., Atlanta, GA (US); AT&T Mobility II LLC, Atlanta, GA (US)

(72) Inventors: Mark Stockert, San Antonio, TX (US); Thomas J. Routt, Sequim, WA (US); Jerry Robinson, Middletown, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 208 days.

(21) Appl. No.: 17/963,657

(22) Filed: Oct. 11, 2022

(65) Prior Publication Data
US 2024/0119550 A1    Apr. 11, 2024

(51) Int. Cl.
*G06Q 50/26* (2024.01)
*G06N 5/045* (2023.01)
*G06N 10/20* (2022.01)

(52) U.S. Cl.
CPC .......... *G06Q 50/265* (2013.01); *G06N 5/045* (2013.01); *G06N 10/20* (2022.01)

(58) Field of Classification Search
CPC ....... G06Q 50/265; G06N 5/045; G06N 10/20
See application file for complete search history.

(56) References Cited

U.S. PATENT DOCUMENTS

| | | | |
|---|---|---|---|
| 7,451,292 B2 | 11/2008 | Routt | |
| 10,965,777 B2 | 3/2021 | Stockert et al. | |
| 11,108,617 B2 | 8/2021 | Stockert et al. | |
| 11,836,805 B1* | 12/2023 | Culbertson, II | G06Q 40/08 |
| 2005/0086227 A1* | 4/2005 | Sullivan | G06T 17/05 |
| 2009/0037155 A1* | 2/2009 | Glomann | G05B 23/0221 |
| | | | 703/2 |
| 2009/0319180 A1* | 12/2009 | Robinson | G06Q 10/10 |
| | | | 701/532 |

(Continued)

OTHER PUBLICATIONS

Yang, Xiaoka, et al. "Research on the Digital Twin Platform and Emergency Response Technology for Rail Transit Operation Emergencies." 2023 IEEE 8th International Conference on Intelligent Transportation Engineering (ICITE). IEEE, 2023. (Year: 2023).*

(Continued)

*Primary Examiner* — Corey Russ
(74) *Attorney, Agent, or Firm* — Guntin & Gust, PLC; Robert Gingher

(57) ABSTRACT

Aspects of the subject disclosure may include, for example a device having a processing system including a processor; and a memory that stores executable instructions that, when executed by the processing system, facilitate performance of operations of: creating a quantum digital twinning model for a public safety event; generating a map view of an area of the public safety event, wherein the map view shows images determined by the quantum digital twinning model; providing recommendations for actions to mitigate the public safety event, wherein the recommendations are determined from the quantum digital twinning model; and providing explainability of the recommendations determined. Other embodiments are disclosed.

20 Claims, 10 Drawing Sheets

(56) References Cited

U.S. PATENT DOCUMENTS

| | | | |
|---|---|---|---|
| 2013/0066609 A1* | 3/2013 | Gilkes | G06F 16/29 |
| | | | 703/6 |
| 2017/0161614 A1* | 6/2017 | Mehta | G06N 20/00 |
| 2017/0286572 A1* | 10/2017 | Hershey | B64F 5/60 |
| 2017/0358195 A1* | 12/2017 | Bobda | G08B 13/19613 |
| 2018/0150763 A1* | 5/2018 | Dluhos | G06E 3/00 |
| 2018/0276582 A1* | 9/2018 | Qian | G06Q 10/0635 |
| 2019/0376792 A1* | 12/2019 | Chen | G01C 21/3647 |
| 2020/0225655 A1* | 7/2020 | Cella | H04L 1/0076 |
| 2020/0402192 A1* | 12/2020 | Dahm | G09B 29/006 |
| 2021/0157662 A1* | 5/2021 | Heckey | G06F 9/5072 |
| 2022/0253076 A1* | 8/2022 | Cleland-Huang | G05D 1/692 |
| 2023/0007451 A1* | 1/2023 | Stone | G06F 30/20 |
| 2023/0318836 A1* | 10/2023 | Covaci | H04L 9/0637 |
| | | | 713/168 |
| 2024/0039945 A1* | 2/2024 | Agrawal | H04L 63/101 |
| 2024/0046001 A1* | 2/2024 | Brandl | G06Q 50/16 |
| 2024/0046565 A1* | 2/2024 | Wernau | G06T 19/003 |
| 2024/0064001 A1* | 2/2024 | Winstrom | H04L 63/065 |
| 2024/0103594 A1* | 3/2024 | Cella | G06Q 30/018 |
| 2024/0290088 A1* | 8/2024 | Roy | G06Q 40/08 |
| 2025/0209742 A1* | 6/2025 | Richwagen | G06T 15/20 |

OTHER PUBLICATIONS

Ivanov, Sergey, et al. "Digital twin of city: Concept overview." 2020 Global Smart Industry Conference (GloSIC). IEEE, 2020. (Year: 2020).*

Routt, Thomas J. et al., "Quantum Artificial Intelligence Positioning System in a Next Generation Public Safety Network", U.S. Appl. No. 17/734,632, filed May 2, 2022, 69 pages.

Stockert, Mark, "System and Method for Managing Communication Networks With Quantum Blockchains", U.S. Appl. No. 17/498,229, filed Oct. 11, 2021, 56 pages.

* cited by examiner

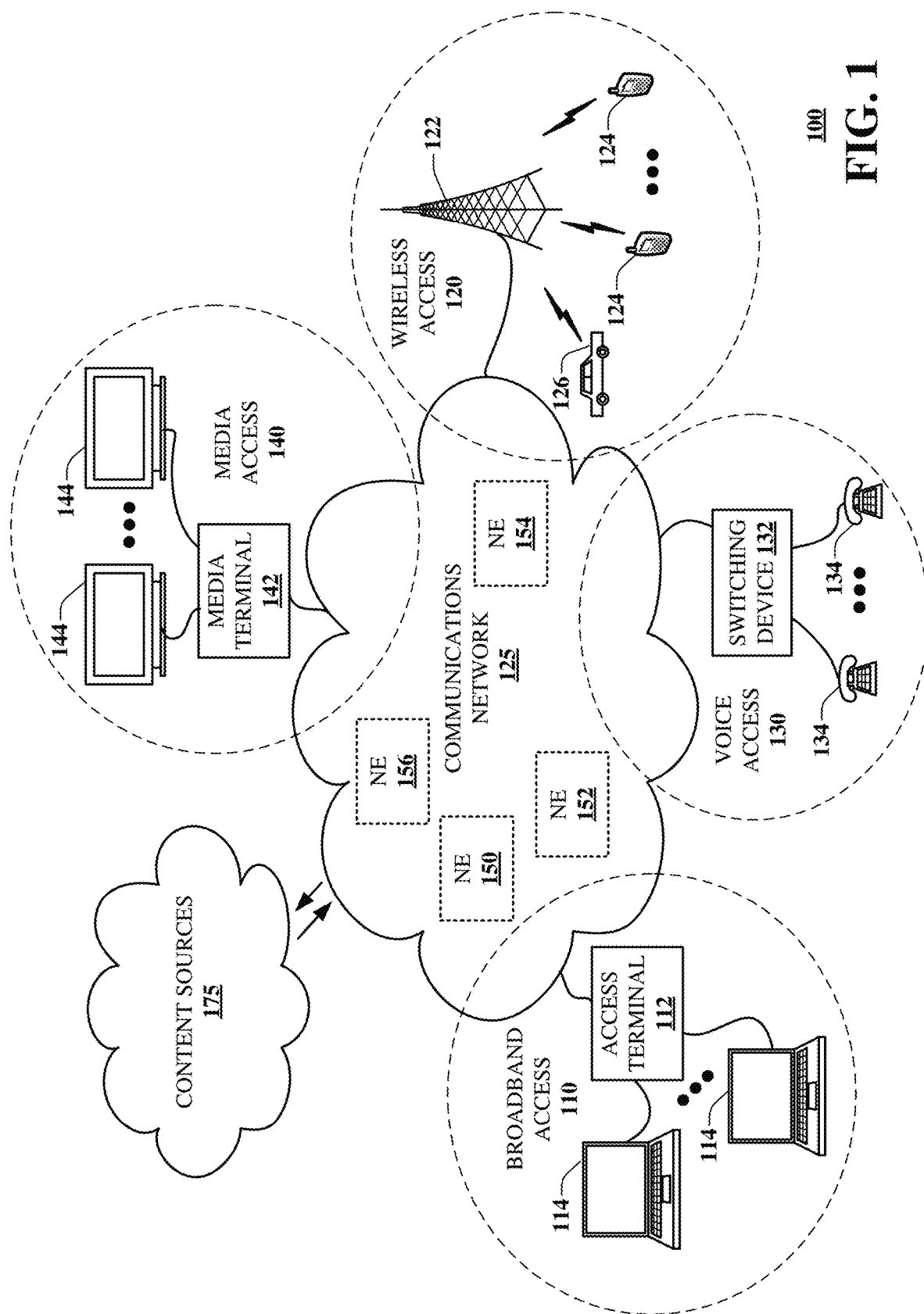

220

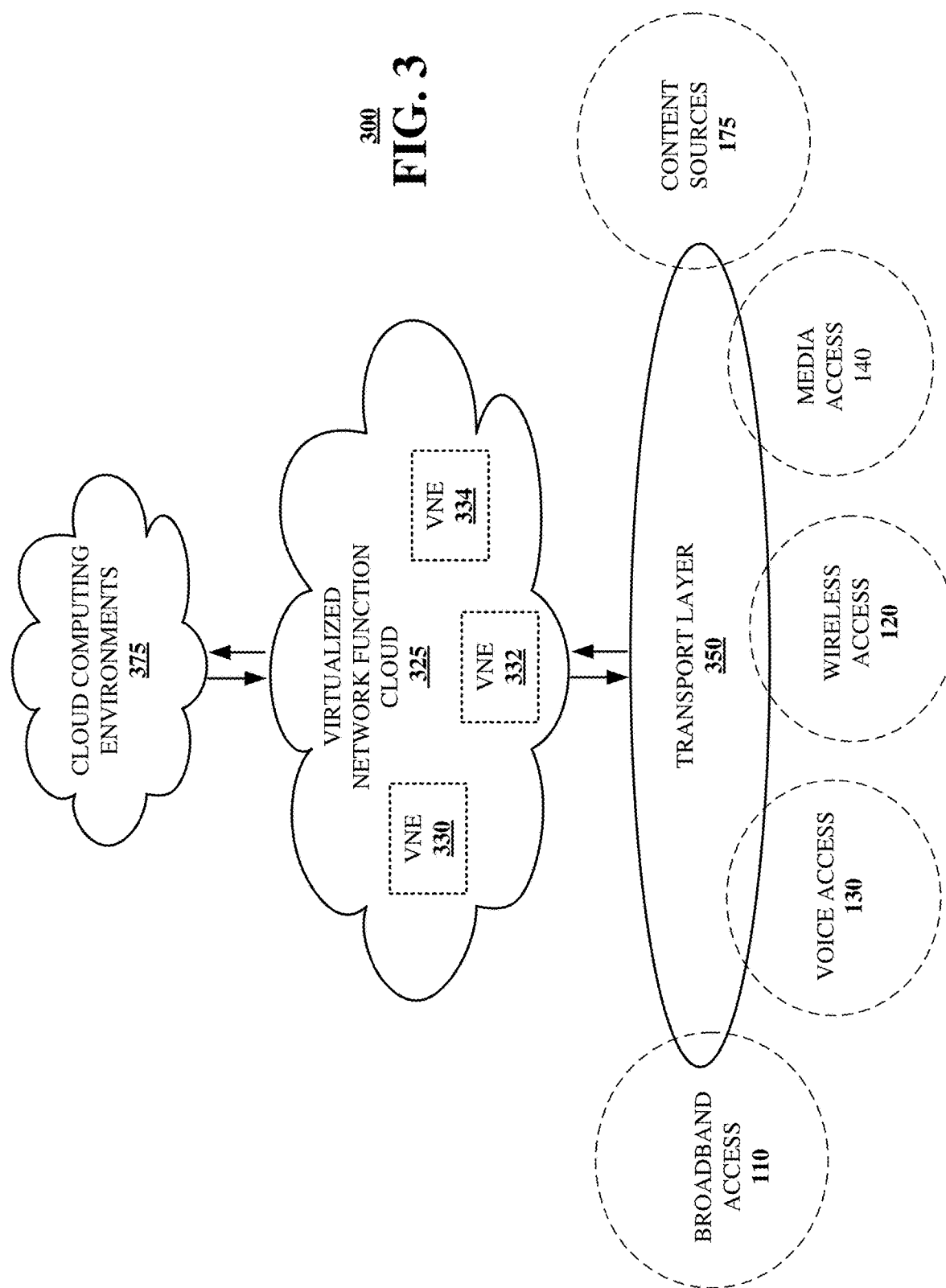

SYSTEM AND METHOD FOR QUANTUM DIGITAL TWINNING AND PUBLIC SAFETY MANAGEMENT

FIELD OF THE DISCLOSURE

The subject disclosure relates to a system and method for quantum digital twinning and public safety management.

BACKGROUND

First responders rely on highly-available, low-latency-access communications and network infrastructures and location-based situational awareness, reflecting the overarching public safety community's requirement to respond to the entire spectrum of routine, emergency, and disaster emergency scenarios—both natural and manufactured—at a moment's notice. Rapid, real-time data collection and actionable analytics based on those data are equally central to first responder's immediate, properly directed responses.

Most public safety events occur without warning, and all require a rapid and flawless response with no room for error. Timely, multi-disciplinary, coordinated responses across agency lines is mission-critical to protect the communities and citizens that first responders are charged to serve. Whether the event is a fire, natural disaster (i.e., hurricane, earthquake, forest fire, flood, commercial disaster), vehicular collision, search and rescue operation, act of terrorism, or apprehension of suspects, highly available, low access-latency networks, real-time data collection, real-time three-dimensional (3D) location-based situational awareness, and actionable analytics provide the common denominator to successful first responder's rapid response.

For certain emergencies there may be no warning—such as with a vehicle accident or an earthquake. In these cases, the public safety response is reactive, and the goal is preparation to deploy assets as soon as possible. For many emergencies, assets can be deployed in anticipation of a predicted event: hurricanes, snowstorms, and downstream flooding often allow for days of preparation. Some circumstances, such as an armed confrontation or build-up towards war, may allow weeks for deployment of assets.

During public safety incidents, first responders, public safety entities (PSEs), and public safety agencies (PSAs) alike need to continually track and intercommunicate to ensure a coordinated incident response resulting in better outcomes. The location and tracking of first responders are a foundational public safety requirement, including for example, while in vehicles, on a foot chase, involved in search-and-rescue operations, fighting wildfires, restoring communications in the wake of a flood or earthquake, or inside a high-rise building responding to an incident. Public safety events can severely stress communications networks by damaging infrastructure, disrupting established traffic patterns, and damaging interdependent systems (water, power, etc.).

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 3 is a block diagram illustrating an example, non-limiting embodiment of a virtualized communication network in accordance with various aspects described herein.

DETAILED DESCRIPTION

Figure 2A:
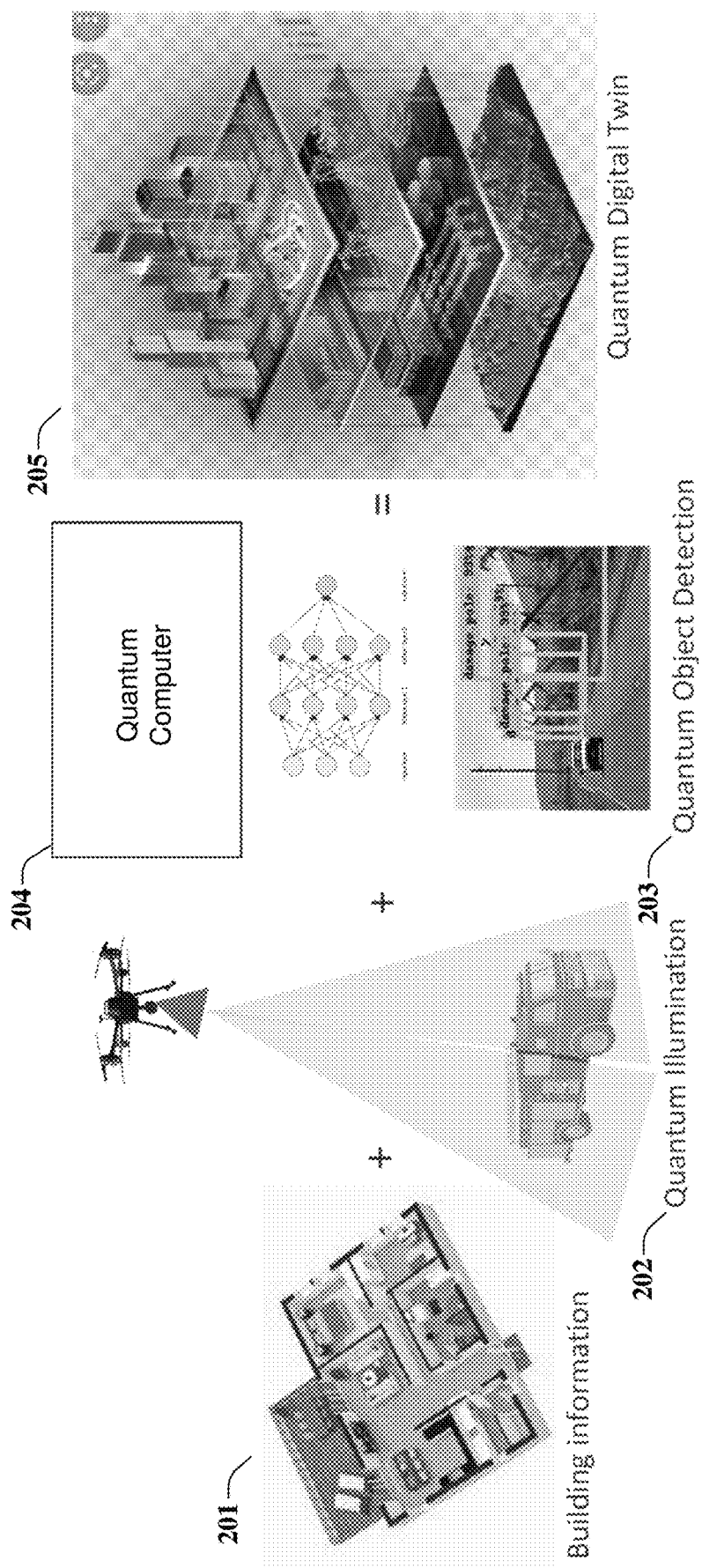
FIG. 2A is a block diagram illustrating an example, non-limiting embodiment of a process of a quantum digital twinning system creating a quantum digital twin in accordance with various aspects described herein.

The subject disclosure describes, among other things, illustrative embodiments for quantum digital twinning system for managing public safety. Other embodiments are described in the subject disclosure.

One or more aspects of the subject disclosure include a device having a processing system including a processor; and a memory that stores executable instructions that, when executed by the processing system, facilitate performance of operations of: creating a quantum digital twinning model for a public safety event; generating a map view of an area of the public safety event, wherein the map view shows images determined by the quantum digital twinning model; providing recommendations for actions to mitigate the public safety event, wherein the recommendations are determined from the quantum digital twinning model; and providing explainability of the recommendations determined.

One or more aspects of the subject disclosure include a non-transitory, machine-readable medium with executable instructions that, when executed by a processing system including a processor, facilitate performance of operations including generating a map view of an area of a public safety event, wherein the map view shows images determined by a quantum digital twinning model; recommending actions to mitigate damage of the public safety event, wherein the recommendations are determined from the quantum digital twinning model; and providing explainability of the recommendations determined.

One or more aspects of the subject disclosure include a method of displaying, by a processing system including a processor, a map view of an area of a public safety event, wherein the map view shows images determined by a quantum digital twinning model, wherein the quantum digital twinning model comprises three-dimensional images with classified objects stored as a graph; recommending actions, by the processing system, to mitigate damage of the public safety event, wherein the recommendations are determined from the quantum digital twinning model; and providing, by the processing system, explainability of the recommendations determined.

Referring now to FIG. 1, a block diagram is shown illustrating an example, non-limiting embodiment of a system 100 in accordance with various aspects described herein. For example, system 100 can facilitate in whole or in part displaying a map view of an area of a public safety event; recommending actions to mitigate damage of the public safety event determined from the quantum digital twinning model; and providing explainability of the recommendations determined. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a process 200 of a quantum digital twinning system creating a quantum digital twin in accordance with various aspects described herein. A digital twin is a digital representation of a real-world object or system. In this embodiment, a digital twin is a model or models of public safety emergency scenarios—both natural and manufactured, i.e., a public safety digital twin. The quantum digital twinning system uses information to create a quantum digital twin that creates a digital model of three-dimensional systems at much higher resolutions than laser scanning techniques known in the art. The quantum digital twinning system combines building information 201 and quantum illumination data 202 (quantum three-dimensional (3D) imaging, video, acoustic, motion, classical images, etc.) from mobile devices, drones, Internet of Things (IoT) sensors, quantum illumination sensors, map data (topography maps, utility maps, government maps, electrical grid maps, building floor plan maps and characteristics), satellite sensor data (imaging, quantum sensors, etc.), environmental sensor data (chemical, temperature, infrared, barometric pressure, atmospheric, etc.), geo-tagged location data, social network data feeds/crowd sourced data (twitter, blogs, etc.), quantum holographic sensor data, and two-dimensional (2D)/3D quantum object detection 203 with quantum computing 204 (quantum federated reinforcement learning) to detect, monitor, alert, track and predict the area, direction, and rate of expansion a public safety event represented by a quantum digital twin 205. Maps in the quantum digital twin 205 can be overlayed or separated out as layers on a display, as illustrated in FIG. 2A.

The history of a public safety situation is captured as a real-time footprint and damage assessment maps represented as a digital twin model. Historical data are input to quantum/classical machine learning models to generate a prediction including a time-lapsed progression of future trends that are displayed on a map (i.e., fast forward button). Prediction/insights are available as suggestions to inform public safety and first responders as to when patterns (traffic, weather, etc.) are predicted to worsen or improve during an incident and actions that may be taken to mitigate damages. The system user interface could be a simple web page on a mobile terminal or a more inclusive display that combines 2D/3D quantum holographic and/or augmented reality (AR) or virtual reality (VR) displays with audio, haptics, and other sensory information. The maps have adjustable time increments and can be played back or forward (predicted) such as a time-lapse movie to enable an observer to observe how a public safety incident progressed and/or will progress over time.

Figure 2B:
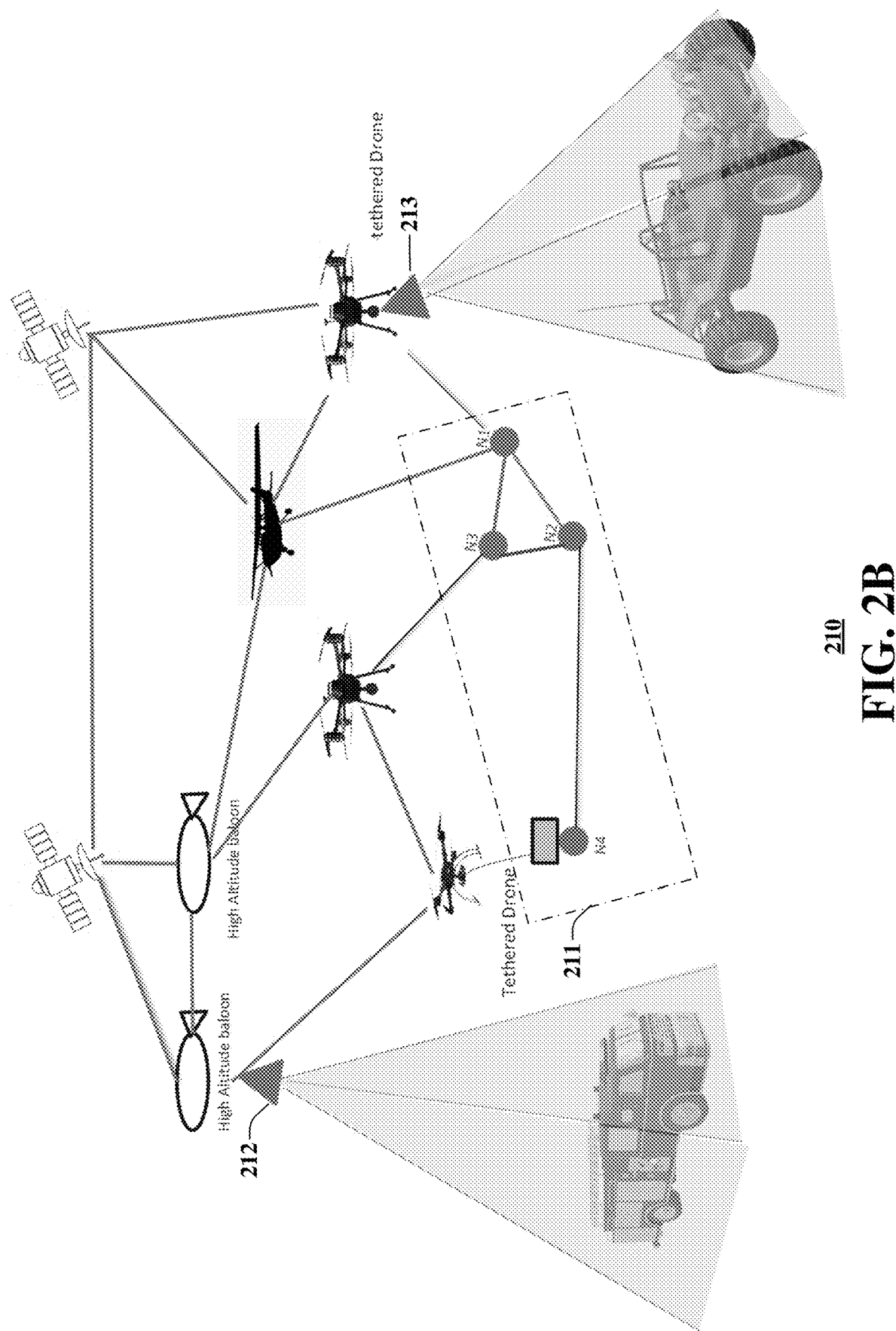
FIG. 2B is a block diagram illustrating a quantum illumination and object detection process 210 in more detail in accordance with various aspects described herein.

FIG. 2B is a block diagram illustrating a quantum illumination and object detection process 210 in more detail in accordance with various aspects described herein. Quantum illumination is a method for target detection that uses quantum entanglement to improve the optical or microwave radar capability to detect targets at a distance from the detector, as shown in FIG. 2B. By exploiting fundamental laws of physics (quantum entanglement) quantum sensors can achieve orders of magnitude improvements in image precision. The Rayleigh criterion (Rayleigh limit) is the minimum resolvable detail that a non-quantum optical imaging process can achieve. A non-quantum imaging process is diffraction-limited when the first diffraction minimum of the image of one source coincides with the maximum of another. Classical imaging is dependent on the wavelength λ of a particle that interacts with an object. If a non-quantum imaging system is considered to be perfect, then the resolution (~λ/2) of any imaging process will be limited by diffraction.

In a fully quantum optical or microwave imaging system the resolution of images can exceed the Rayleigh limit and is Heisenberg limited, thus improving image resolution beyond what is possible with non-quantum optical systems. The quantum limit for image resolution is about two to ten times higher than the Rayleigh limit. In addition, quantum imaging cancels atmospheric dispersion and can produce images in total darkness. Non-quantum 3D imaging couples a micro lens array with an image detector to capture a visual reproduction with depth cues. However, non-quantum 3D imaging suffers from a loss of resolution. Quantum 3D imaging devices use quantum position entanglement and photon-number correlations to dramatically improve 3D image quality.

A fully quantum optical or microwave imaging system (still, video, etc.) is represented that uses quantum 3D imaging devices using quantum position entanglement and photon-number correlations. As shown in FIG. 2B, quantum 3D object detectors 212, 213 with quantum image input locates objects, draws a 3D bounding box around the object, classifies each object in the image and where it is geographically located by tagging the object with location information. A quantum image (still, video, etc.) is an image stored in a set of qubits regardless of the source image information be it quantum or classical. In this embodiment quantum images are stored in a quantum graph database 211. Various methods for creating quantum image representation models are well known in the art. The two most popular models are the flexible representation for quantum images (FRQI) model and the novel enhanced quantum representation (NEQR) model. Both of these models are available today to store images on quantum computers using open-source software development kit (Quantum Information Kit for Quantum Computation, or Qiskit), for working with quantum computers.

Computer object detection is the process of taking an input image of a scene, locating objects, drawing a bounding box, and classify each object in the image. Object detection identifies: 1) what objects are on an image and 2) where they are on the image. Given an input image, an algorithm generates a list of objects with a label and location. Location in this context is a bounding box with coordinates. Object detection is an extension of image classification. Object detection is a much harder task than image classification. It must not only recognize and classify objects in an image but also count and localize objects by drawing a boundary box around each object. Object detection has advanced rapidly in the last few years through the application of deep convolutional neural networks (CNNs).

Figure 2C:
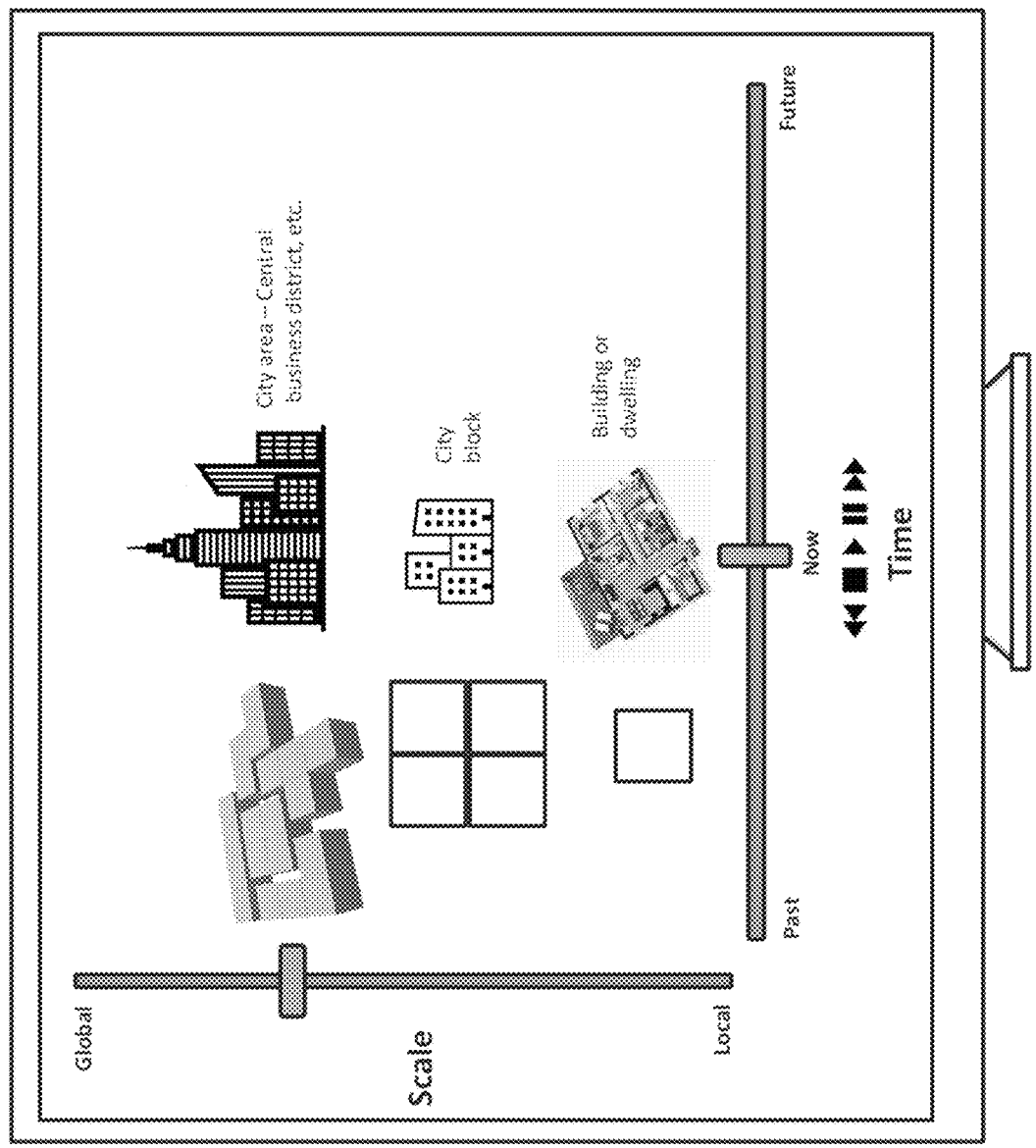
FIG. 2C is a block diagram illustrating an example, non-limiting embodiment of a user interface for a quantum digital twinning system for managing public safety in accordance with various aspects described herein.

FIG. 2C is a block diagram illustrating an example, non-limiting embodiment of a user interface for a quantum digital twinning system for managing public safety in accordance with various aspects described herein. As shown in FIG. 2C, UI 220 provides a local map view of an area showing images that can be drilled down from a higher level of abstraction to a more detailed level with much higher granularity. Localized digital twin public safety models may be combined into a composite global model of a wider area public safety event or emergency scenario. Localized digital twin models can be deployed on the edge of the network. Global models can be centrally cloud based. Information displayed on UI 220 would be tailored to users based on profiles and preferences stored as policies. Police, Fire, EMTs, public utility repair crews, and other parties would have different profiles and information displayed.

In an embodiment, UI 220 is automatically tuned to emphasize aspects of an incident. For example, for a flood the user interface would graphically show topological features, creeks/rivers/flow rates, rate of rising streams, risk to highway crossings, and routes for evacuation. For a wide area fire, UI 220 would display roads/fire coverage, homes/buildings, locations of crews/trucks, and other relevant information. The history of a public safety situation is captured as real-time footprint and damage assessment maps represented as a digital twin model. The maps have adjustable time increments and can be played back or forward (predicted) like a time-lapse movie so an observer could see how a public safety incident progressed and/or will progress over time based on predictions made by the quantum digital twinning system.

Public safety management requires simultaneous, real-time data from diverse and connected systems including the following:

IoT sensors, quantum imaging, image analysis, infrared sensors (ground-based, unmanned aerial vehicles (UAVs)), audio analysis, and 2D/3D quantum machine learning object detection.
 Social media data (Twitter, Instagram, blogs, SMS, etc.) and analysis (natural language processing—NLP).
 Temporal and spatial analysis and prediction.
 Location and related parameters (for example speed of a mobile device, intensity of braking, etc.) could be inputs to predict device analysis requirements.
 Atmospheric imaging (weather satellites, quantum atmospheric imaging, etc.) for local and global atmospheric detection and prediction.

Figure 2D:
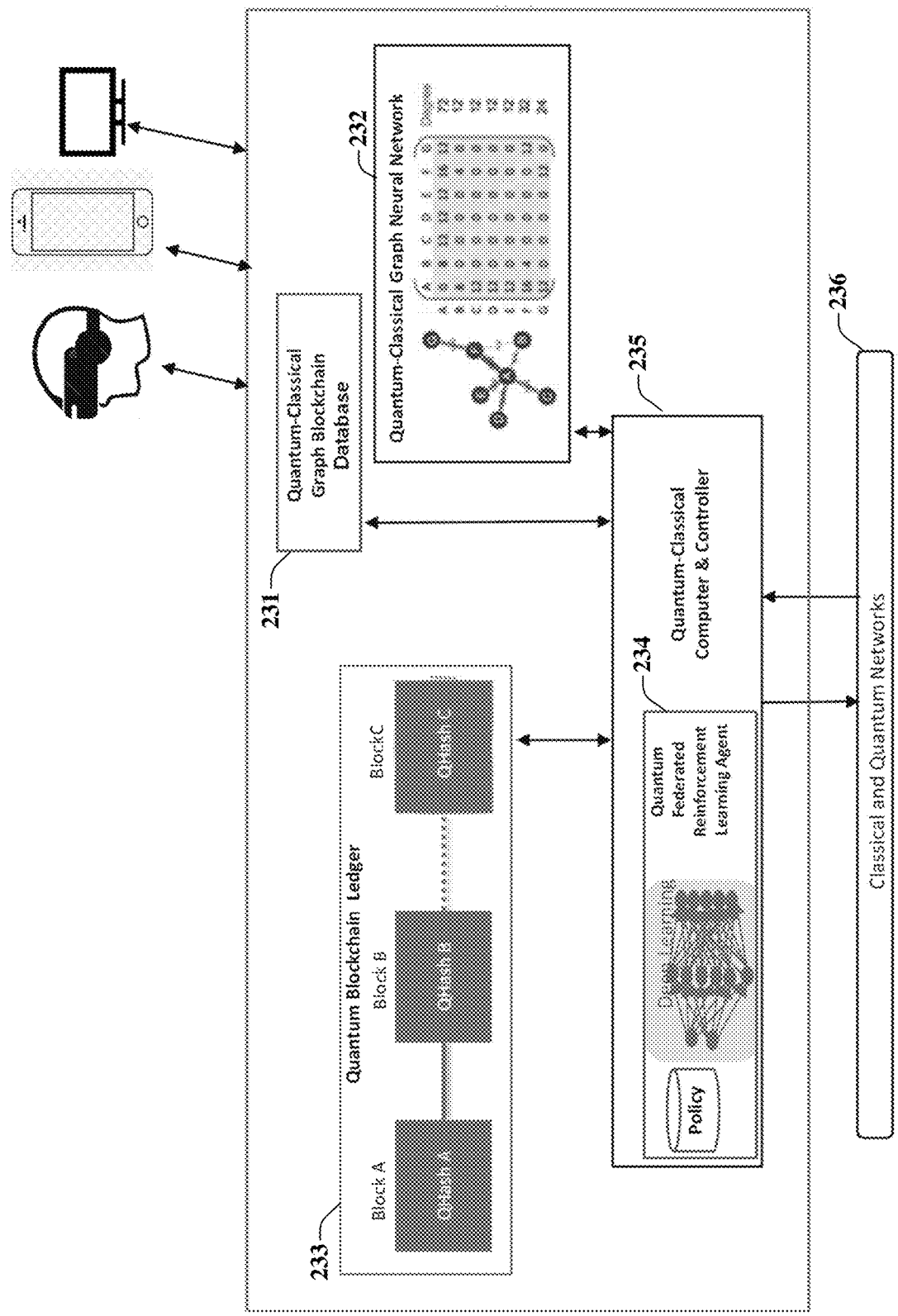
FIG. 2D is a block diagram illustrating an example, non-limiting embodiment of a quantum digital twinning system for managing public safety in accordance with various aspects described herein.

FIG. 2D is a block diagram illustrating an example, non-limiting embodiment of a quantum digital twinning system for managing public safety in accordance with various aspects described herein. As shown in FIG. 2D, quantum digital twinning system 230 comprises a quantum graph database 231, a quantum-classical graph neural network 232, a quantum blockchain ledger 233, a quantum-classical federated reinforcement learning agent 234 in one or more quantum processors or classical processors (processors 235) that interface with other systems through classical and quantum networks 236. See U.S. Pat. No. 7,451,292 entitled Methods for Transmitting Data Across Quantum Interfaces and Gates Using Same, issued Nov. 11, 2008, which is incorporated by reference herein.

Quantum graph database 231 stores local maps and images on the maps. Local grids link with a global grid or sub-global grids for an area. This is the primary storage for local and global maps. Quantum graph database 231 stores geographic and overlay maps of roadways, road traffic load, delays, etc. (from deep learning analytics of localized data), network traffic status, topological maps, utility maps and overall network status stored as graphs. Quantum graph database 231 is a key component of digital twin models because of a connection context across different data sources. In this embodiment sub-graphs for different systems are stored, such as:

Electrical distribution system graphs
Water distribution system graphs
Street, road, and highway system graphs
Wireless, cable and wired/optical network system graphs
Traffic management system graphs
Traffic lights and other road management system graphs
Vehicle system graphs Quantum graph database 231 vertices represent connectivity between connected device entities. Quantum graph database 231 arcs represent relationships between entities and capture the physical structure of a system. Quantum computing of graph adjacency matrices is inherently more time- and space-efficient than experienced using classical computation. A quantum-classical graph neural network 232 will run model simulations until an approximate optimal distributed, entangled qubit configuration is reached.

Location and movement of objects is also stored in the quantum graph database 231. See U.S. patent application Ser. No. 17/734,632, entitled Quantum Artificial Intelligence Positioning System in a Next Generation Public Safety Network, filed May 2, 2022, which is incorporated by reference herein. The data from a map's history is input to quantum/classical machine learning models to predict in real-time future trends that are displayed on a map (think of a fast forward button). Prediction/insights are available as suggestions to help first responders know when patterns (traffic, weather, etc.) are predicted to get worse or improve during a public safety event.

Deep learning 2D/3D detects objects with quantum imaging and storage of objects in a quantum graph database 231 using a quantum-classical graph neural network 232. Deep learning change detection compares images and objects before and after a public safety incident to identify potential differences and detect damage and other effects due to an incident (floods, fires, earthquakes, etc.). Scene interpretation using point clouds with 3D image input from 3D scanned images and output of object classification, part segmentation and semantic segmentation (scene interpretation). Scene graphs are stored in quantum graph database 231, which arranges the logical and spatial representation of graphical scenes for pre and post disaster events. Scene graphs are 3D models of an image (still or video) with 3D data stored in nodes of a graph, i.e., a 3D scene graph. Knowledge graphs are a knowledge base that encodes how a world is structured. Common-sense knowledge graphs are used as prior knowledge for generation of scene graphs.

Quantum blockchain ledger 233 stores transactional, smart contract and policy data, model data, and other system data. See U.S. patent application Ser. No. 17/498,229. Entitled System and Method for Managing Communication Networks with Quantum Blockchains, filed Oct. 22, 2021, which is incorporated by reference herein. The distributed quantum blockchain ledger 233 stores smart contracts. Smart contracts in this embodiment are primitives (governing contracts) for two-party or multi-party secure allocation, scheduling and management of computation and network resources. Quantum blockchain entries can be copied and stored at external entities for auditing, verification, and management. In addition, identity and location can be used to create unique tokens for blockchain execution. A network node produces a local location token and applications produce trusted identity tokens. See U.S. Pat. No. 10,965,777 entitled Application Management of Network Slices with Ledgers, issued Mar. 30, 2021, which is incorporated by reference herein.

Quantum-classical federated reinforcement learning agent 234 comprises an experience replay for local agents on the digital twins. Local models are federated to a global model. A quantum federated reinforcement learning global model and model parameters are stored on a quantum blockchain ledger 233. The local agents learn from the digital twin public safety event model and suggest actions to operators and emergency personnel. Quantum-classical federated reinforcement learning agent 234 updates a global quantum federated reinforcement learning model with local model parameters. Quantum-classical federated reinforcement learning agent 234 randomly selects experience replay data using a uniform or other data distribution method and/or random model trajectories are selected or combinations of these methods. Experience replay algorithms have the ability to tradeoff computational complexity for learning speed by tuning the experience replays at every update. A low value for experience replays will increase computational efficiency while a high value accelerates learning. Periodic pruning of the data sample database is necessary to prevent the database from growing indefinitely.

Quantum-classical federated reinforcement learning agent 234 in this embodiment has these characteristics:

Distribution—two or more distributed agents jointly build a model to solve problem.
A global agent that combines model updates from local agents.
Independent Data—each agent holds independent data and uses it for model training.
Data protection—the data held by each agent is not sent to the other agent during model training. The agent learning is conveyed through model parameters that do not involve privacy.
Secure communication—the model is transmitted between parties with the support of an encryption scheme. The original data cannot be inferred even if it is eavesdropped during transmission.
Guaranteed performance. The performance of the resulting model is remarkably close to that of the ideal model established with all data transferred to one centralized party. Service models, such as network slicing, can be maintained.
A global agent stores global model updates in quantum blockchain ledger 233 for transparency and auditability.
Global updates are available for review, modification, and approval by human operators before, during and after model updates are sent to local agents.
Global model updates are stored in quantum blockchain ledger 233 to provide transparency, auditability, human modification, and explainability of the global model and model changes. Explainability or explainable machine learning is an important requirement for public safety trust and confidence in quantum reinforcement machine learning (QRML) systems. Explainability provides user task-focused information and levels of abstraction commensurate with the user's understanding abilities. For example, explainability for the model developers/maintainers would include details of model algorithms, hyperparameters, and data necessary to understand the model design and functioning. However, for a public safety "commander," explainability would be a higher-level abstraction that is simplified for the commander by providing a more generalized description of an analysis that the QRML system performed, so that the commander will have an understanding and will trust the model predictions and output.

A learning environment for public safety event response training and pre-sales support. Public safety event coordination requires networked coordination and decision making. To improve decision making, training with simulated events and learning behaviors for policies and guidelines are required. Interactive, virtual simulations can be run with reinforcement learning agents and human-in-the loop users through a public safety event interface. Policies and rewards can be evaluated and adjusted. The user/operator interface can be recorded, evaluated, and analyzed for policies and responses. Different user/operator interfaces for "commander" with a simple UI, hands free voice control, chatbot communications operator control, 3D AR/VR and other immersive interfaces are part of the learning environment. Event controls for different Quality of Service (QoS) and priorities can be assessed in a learning environment:

QoS, Priority: Police/Fire/Medical over infrastructure technicians, FBI over local, etc.

Bandwidth: (text, voice, high bandwidth video and images, including VR for procedures: (bomb, machinery, console)

Sensor mesh/IoT upload.

Initial deployment of quantum/classical networks would require an overlay of quantum network elements and classical network elements where elements may be hybrid quantum/classical, classical and/or quantum only. Quantum computing elements may be adjunct to the resource controller.

5G/6G+ Devices/Applications moving in an area could take advantage of real-time data and low latency. The area could be defined by a geo-fence and other parameters. Movement may also be determined by 5G/6G+ next generation network load and location & time granularity, i.e., a global view for remote locations from a public safety event and a local view for nearby locations. Quantum deep learning predicts public safety event area and pre-emptively download/move/provision digital twin models and running of models on local data for predicted scenarios. Scenarios may be based on profiles for users and applications and local public safety event specific models based on scenarios and prediction. See U.S. Pat. No. 11,108,617 entitled Methods, Systems, and Devices for Provisioning an Application on a Network Node According to Movement Patterns and Application Parameters for Mobile Devices, issued Aug. 31, 2021, which is incorporated by reference herein. Location and related parameters (for example speed of a mobile device, intensity of braking, etc.) may also be used. Area inputs would be used to predict device analysis requirements.

In an embodiment, a system for quantum image processing is disclosed. A quantum image (still, video, etc.) is an image stored in a set of qubits regardless of the source image information be it quantum or classical. In this embodiment quantum images are stored in a quantum graph database.

In an embodiment, a quantum multi-dimensional object detector is disclosed with a quantum image input that locates objects, draws a multi-dimensional bounding box around the object, classifies each object in the image and where the object is geographically located by tagging the object with location information is embodied.

In an embodiment, a method for building quantum digital twin public safety models is disclosed. A history of public safety situations is captured as real-time footprint and damage assessment maps represented as a digital twin model. The maps have adjustable time increments and can be played back or forward (predicted) for displaying relevant input and all the predicted output. Relevant data includes visual data like a time-lapse movie, audio output, or numerical data such as a latitude, a longitude, an elevation, temperature, and other relevant data so that an observer can see how a public safety incident progressed and/or will progress over time. The system can overlay maps or separate the maps out as layers on a display.

In an embodiment, the quantum digital twinning system stores updates from a global federated reinforcement learning model in a blockchain ledger to provide transparency, auditability, human modification, and explainability of the global model and model changes. Global updates are available for review, approval, and modification by human operators before, during and after model updates are sent to local agents. Explainable quantum artificial intelligence (XAI), explainability, or explainable machine learning (XML) is an important requirement for public safety trust and confidence in a QRML system. Explainability provides user task focused information and levels of abstraction. For example, explainability for the model developers/maintainers would include details of model algorithms, hyperparameters, and data necessary to understand the model design and functioning. For a public safety "commander," explainability would be a higher-level abstraction with the goal of the commander understanding and trusting the model predictions and output.

In an embodiment, a distributed quantum-classical blockchain ledger stores transactional, smart contract and policy data, model data, and other system data. The distributed quantum-classical blockchain ledger stores smart contracts. Smart contracts in this embodiment are primitives (governing contracts) for two-party or multi-party secure allocation, scheduling and management of computation and network resources. quantum-classical blockchain entries can be copied and stored at external entities for auditing, verification, and management. In addition, identity and location can be used to create unique tokens for blockchain execution. A network node produces a local location token and applications produce trusted identity tokens.

In an embodiment, deep learning performs multi-dimensional object detection on quantum images and storage of objects in a quantum graph database using a quantum-classical graph neural network is disclosed. A quantum graph database stores geographic and overlay maps of roadways, road traffic load, delays, etc. (from deep learning analytics of localized data), network traffic status, topological maps, utility maps and overall network status as graphs. Quantum graph databases are a key component of digital twin models because they connect context across different data sources. In this embodiment, a plurality of sub-graphs for various systems are stored such as the following:

Electrical distribution system graphs
Water distribution system graphs
Street, road, and highway system graphs
Wireless, cable and wired/optical network system graphs
Traffic management system graphs
Traffic lights and other road management system graphs
Vehicle system graphs Quantum graph database vertices represent connectivity between connected device entities. Quantum graph database arcs represent relationships between entities and capture the physical structure of a system. Quantum computing of graph adjacency matrices is inherently more time- and space-efficient than experienced using classical computation. The quantum-classical neural network model will run until an approximate optimal distributed, entangled qubit configuration is reached.

In an embodiment, the quantum digital twinning system stores location and movement of objects in the quantum graph database. Data from a map history is input to quantum/classical machine learning models to predict in real-time future trends that are displayed on a map (e.g., like a fast forward button). The system makes predictions and insights available as suggestions to help first responders know when patterns (traffic, weather, etc.) are predicted to get worse or improve during a public safety event.

In an embodiment, the quantum graph database comprises local grids link with a global grid or sub-global grids for an area. The quantum graph database is the primary storage locally and globally.

In an embodiment, the system employs deep learning change detection to compare images and objects before and after a public safety incident to identify potential differences and detect damage and other effects due to an incident (floods, fires, earthquakes, etc.). The system uses scene graph change detection to filter anomalies based on event criteria and training data.

In an embodiment, the system employs scene interpretation using point clouds with 3D image input from 3D scanned images and output of object classification, part segmentation and semantic segmentation (scene interpretation). Scene graphs are stored in quantum graph databases which arrange the logical and spatial representation of graphical scenes for pre and post disaster events. Common-sense knowledge graphs are used as prior knowledge for generation of scene graphs.

In an embodiment, the system comprises quantum-classical federated reinforcement learning with experience replay (ER) for local agents on the digital twins. Local models are federated to a global model. The quantum federated reinforcement learning global model and model parameters are stored on a quantum blockchain ledger. The local agents learn from the digital twin public safety event model and suggest actions to operators and emergency personnel. A global quantum federated reinforcement learning model is also updated with local model parameters from the local agents. The system randomly selects ER data using a uniform or other data distribution method and/or random model trajectories, or combinations of these methods. ER algorithms have the ability to tradeoff computational complexity for learning speed by tuning the ERs at every update. A low value for ERs will increase computational efficiency while a high value accelerates learning. Periodic pruning of the data sample database is necessary to prevent the database from growing indefinitely. Quantum-classical federated learning in this embodiment has the following characteristics:

Distribution—two or more distributed agents jointly build a model to solve problem.

A global agent that combines model updates from local agents.

Independent Data—each agent holds independent data and uses it for model training.

Data protection—the data held by each agent is not sent to the other agent during model training. The agent learning is conveyed through model parameters that do not involve privacy.

Secure communication—the model is transmitted between parties with the support of an encryption scheme. The original data cannot be inferred even if it is eavesdropped during transmission.

Guaranteed performance. The performance of the resulting model is remarkably close 90 to that of the ideal model established with all data transferred to one centralized party. Service models, such as network slicing, can be maintained.

A global agent stores global model updates in a Blockchain ledger for transparency and auditability.

Global updates are available for review, modification, and approval by human operators before, during and after model updates are sent to local agents.

Global model updates are stored in the Blockchain ledger to provide transparency, auditability, human modification, and explainability of the global model and model changes. Explainable quantum AI (XQAI), explainability or explainable machine learning is an important requirement for public safety trust and confidence in QRML systems.

In an embodiment, the system provides a learning environment for public safety event response training and pre-sales support. Public safety event coordination requires networked coordination and decision making. To improve decision making, training with simulated events and learning behaviors for policies and guidelines are required. Interactive, virtual simulations can be run with reinforcement learning agents and human-in-the loop users through a public safety event interface. Policies and rewards can be evaluated and adjusted. The user/operator interface can be recorded, evaluated, and analyzed for policies and responses. Different User/Operator Interfaces for "Commander" with a Simple User Interface, hands free Voice Control, Chatbot Communications Operator Control, 3D AR/VR and other immersive interfaces are part of the learning environment. Event controls for different Quality of Service and priorities can be evaluated in a learning environment:

QoS, Priority: Police/Fire/Medical over infrastructure technicians, FBI over local, etc.

Bandwidth: (text, voice, high bandwidth video and images, including VR for procedures: (bomb, machinery, console)

Sensor mesh/IoT upload.

In an embodiment, an initial deployment of quantum/classical networks will require an overlay of quantum network elements and classical network elements where elements may be hybrid quantum/classical, classical and/or quantum only. Quantum computing elements may be adjunct to the digital twinning system.

In an embodiment, the system may deploy 5G/6G+ Devices/Applications moving in an area to take advantage of real-time data and low latency. The area can be defined by a geo-fence and other parameters. The system may also determine movement by 5G/6G+ Next Gen network load and location & time granularity, i.e., a global view for remote locations from a public safety event and a local view for nearby locations. The system may invoke quantum deep learning to predict public safety event area and pre-emptively download/move/provision digital twin models and running of models on local data for predicted scenarios.

Scenarios may be based on profiles for users and applications. Local public safety event specific models are based on scenarios and prediction.

In an embodiment, the system proactively delivers, manages and stores (caches) video, voice, images, holographs, smart contracts and software content in distributed network edge nodes during favorable network conditions (i.e., low traffic volume, higher bandwidth, high quality channels) to avoid network congestion.

Figure 2E:
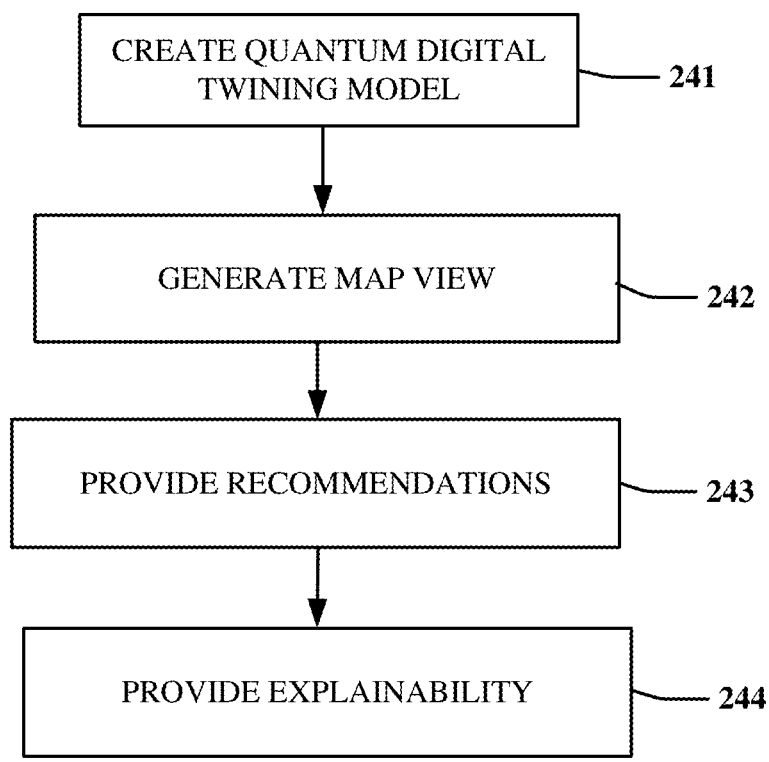
FIG. 2E depicts an illustrative embodiment of a method in accordance with various aspects described herein.

FIG. 2E depicts an illustrative embodiment of a method in accordance with various aspects described herein. As shown in FIG. 2E, method 240 begins at step 241 where the system creates a quantum digital twinning model for a public safety event. A quantum illumination and object detection processes are used to create the quantum digital twinning model, which comprises three-dimensional images with classified objects stored as a graph. Next in step 242, the system generates a map view of the public safety event. The map view can be adjusted to change the level of granularity or to change a period of time. Next in step 243, the system recommends actions that should be taken to mitigate damages of the public safety event using quantum digital twinning model, which comprises historical information and predictions. Finally, in step 244, the system provides explainability of the recommendations, so that the user may understand how the AI employed by the system determined the recommendations, thereby increasing the level of trust of the user in the recommendations.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. For example, while the embodiments disclosed are related to a public safety event, other events and scenarios are contemplated.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of process 200, system 230, and method 240 presented in FIGS. 1, 2A, 2B, 2C, 2D, 2E and 3. For example, virtualized communication network 300 can facilitate in whole or in part displaying a map view of an area of a public safety event; recommending actions to mitigate damage of the public safety event determined from the quantum digital twinning model; and providing explainability of the recommendations determined.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
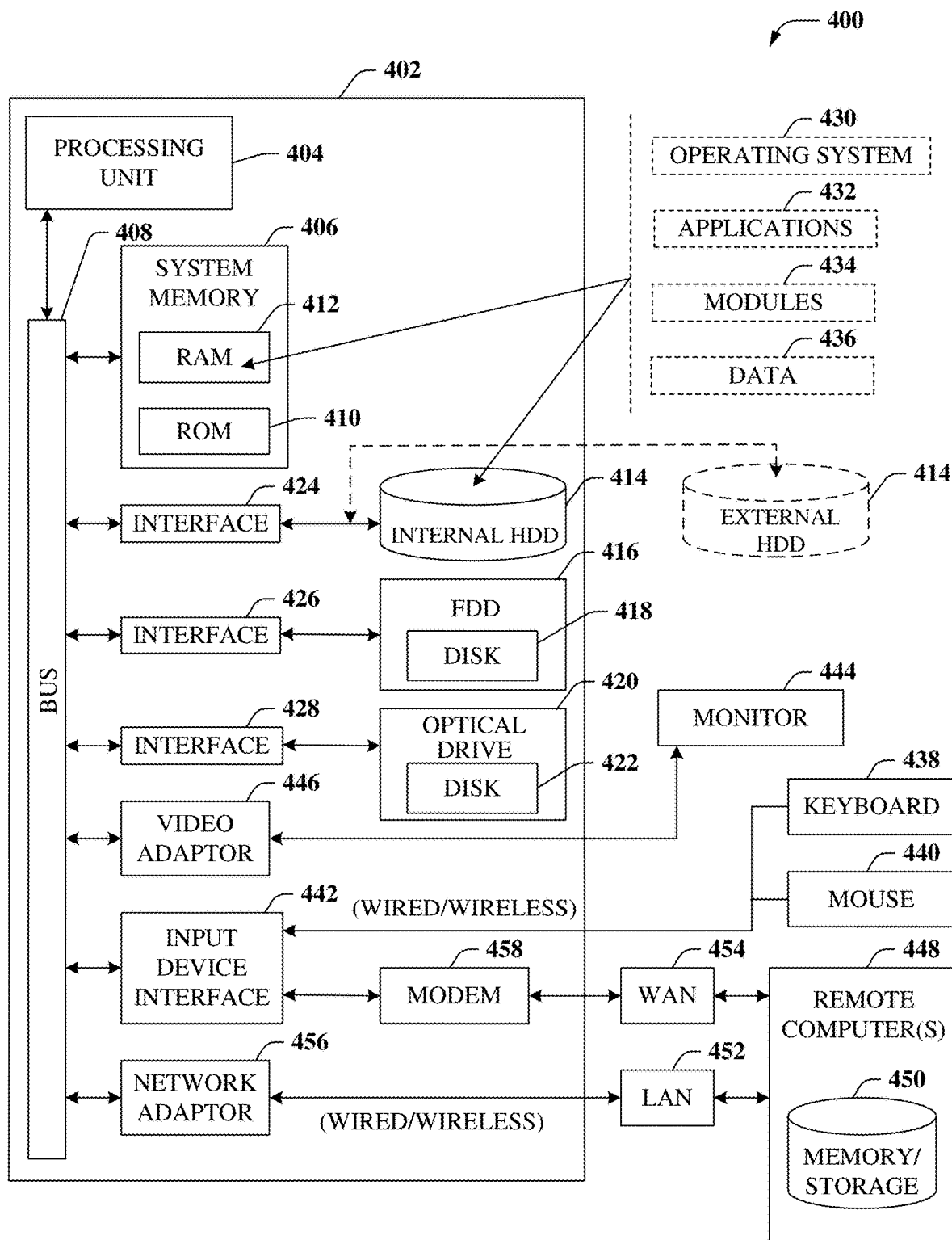
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part displaying a map view of an area of a public safety event; recommending actions to mitigate damage of the public safety event determined from the quantum digital twinning model; and providing explainability of the recommendations determined.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418)

and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
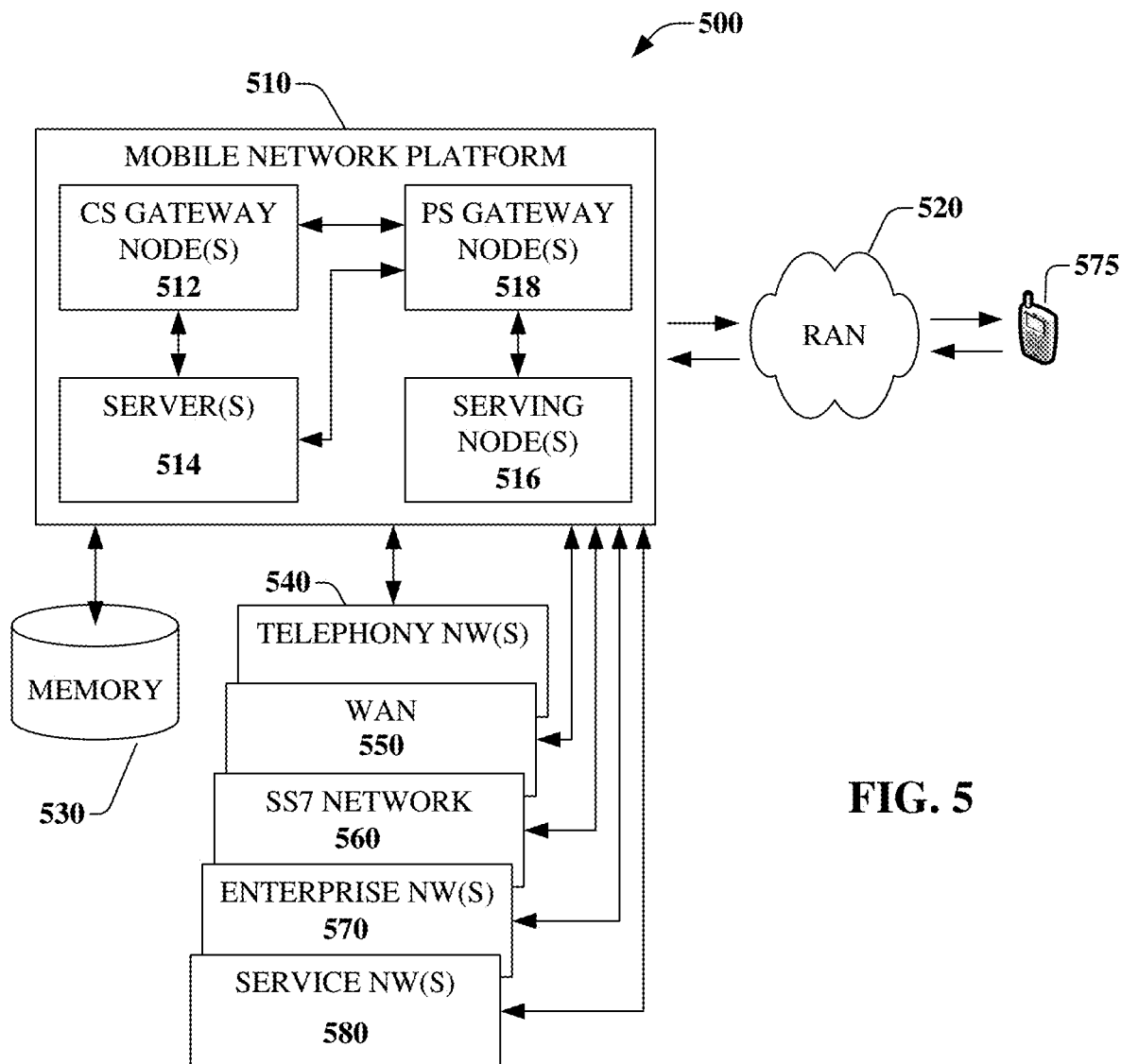
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part generating a map view of an area of a public safety event; recommending actions to mitigate damage of the public safety event determined from the quantum digital twinning model; and providing explainability of the recommendations determined. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
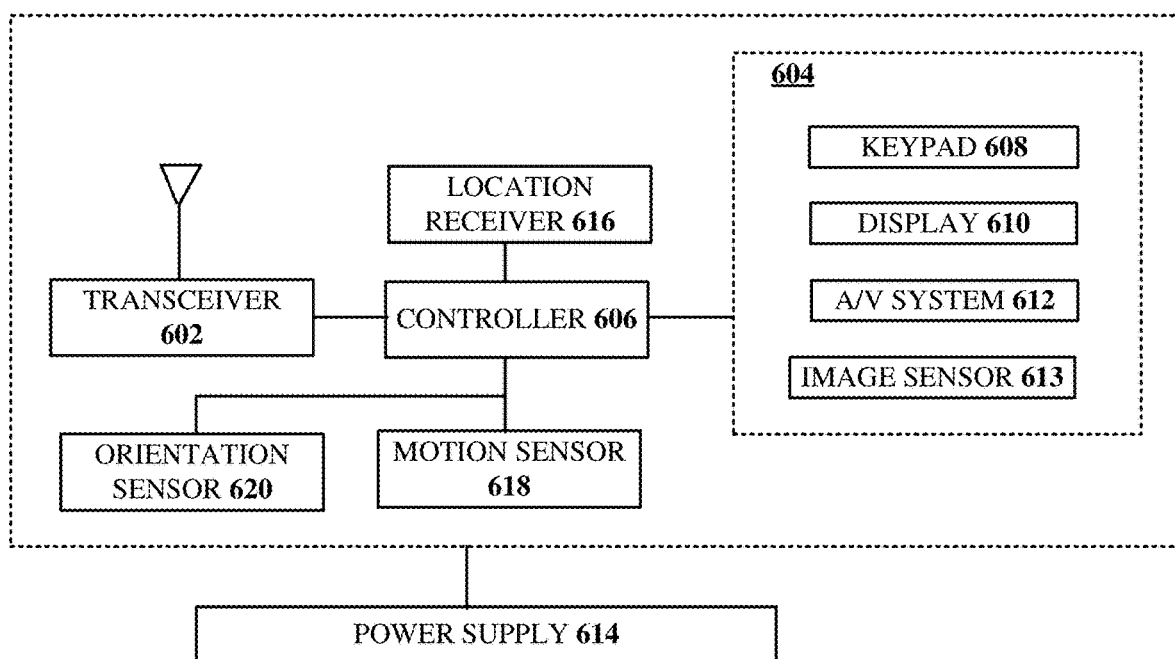
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part displaying a map view of an area of a public safety event; recommending actions to mitigate damage of the public safety event determined from the quantum digital twinning model; and providing explainability of the recommendations determined.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for conducting various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a quantum processing system including a processor; and
   a memory that stores executable instructions that, when executed by the quantum processing system, facilitate performance of operations, the operations comprising:
   acquiring, in real time, multi-modal sensor data including quantum illumination data, quantum holographic sensor data, and conventional information from distributed sources;
   processing the multi-modal sensor data using quantum entanglement-based imaging to generate three-dimensional images with a spatial resolution exceeding a Rayleigh limit, thereby improving an accuracy of object detection and classification in low-visibility or high-noise environments;
   storing the three-dimensional images and classified objects as a graph in a quantum graph database, wherein the quantum graph database enables faster retrieval and analysis of spatial relationships between objects compared to classical databases;
   creating a quantum digital twinning model of a public safety event based on the multi-modal sensor data and the quantum graph database;
   generating a map view of an area, wherein the map view shows images determined by the quantum digital twinning model corresponding to the public safety event;
   providing recommendations for actions to mitigate the public safety event, wherein the recommendations are determined from the quantum digital twinning model; and
   generating and providing an analysis explaining how the recommendations were determined by the quantum processing system, wherein the analysis includes a visualization of causal relationships between detected objects and recommended actions generated using quantum-classical federated reinforcement learning, thereby improving user trust and decision-making speed.

2. The device of claim 1, wherein the operations further comprise changing the map view from a higher level of abstraction to a more detailed level.

3. The device of claim 2, wherein the more detailed level provides a much higher granularity.

4. The device of claim 1, wherein the operations further comprise providing selectable layers in the map view.

5. The device of claim 1, wherein the operations further comprise combining localized quantum digital twinning models into a composite global model of a wider area of the public safety event.

6. The device of claim 1, wherein the operations further comprise providing a future prediction of a time-lapsed progression of the public safety event from the quantum digital twinning model.

7. The device of claim 1, wherein the analysis is tailored for a user of the device.

8. The device of claim 7, wherein the analysis is simplified by providing a more generalized description of the recommendations that were determined.

9. The device of claim 1, wherein the conventional information comprises building information, video, acoustic, motion, classical images from mobile devices, drones, Internet of Things (IoT) sensors, map data, building floor plan maps, satellite sensor data, environmental sensor data, geo-tagged location data, social network data feeds/crowd sourced data, or a combination thereof, and wherein the quantum digital twinning model comprises the three-dimensional images with the classified objects.

10. The device of claim 1, wherein the quantum processing system comprises quantum federated reinforced learning.

11. The device of claim 10, wherein the quantum processing system comprises a plurality of quantum processors operating in a distributed computing environment.

12. A non-transitory, machine-readable medium, comprising executable instructions that, when executed by a quantum processing system including a processor, facilitate performance of operations, the operations comprising:
    acquiring, in real time, multi-modal sensor data including quantum illumination data, quantum holographic sensor data, and conventional information from distributed sources;
    processing the multi-modal sensor data using quantum entanglement-based imaging to generate three-dimensional images with a spatial resolution exceeding a Rayleigh limit, thereby improving an accuracy of object detection and classification in low-visibility or high-noise environments;
    storing the three-dimensional images and classified objects as a graph in a quantum graph database, wherein the quantum graph database enables faster retrieval and analysis of spatial relationships between objects compared to classical databases;
    creating a quantum digital twinning model of a public safety event based on the multi-modal sensor data and the quantum graph database;
    generating a map view of an area, wherein the map view shows images determined by the quantum digital twinning model corresponding to the public safety event;
    recommending actions to mitigate damage of the public safety event, wherein the recommendations are determined from the quantum digital twinning model; and
    generating and providing an analysis explaining how the recommendations were determined by the quantum processing system, wherein the analysis includes a visualization of causal relationships between detected objects and recommended actions generated using quantum-classical federated reinforcement learning, thereby improving user trust and decision-making speed.

13. The non-transitory, machine-readable medium of claim 12, wherein the operations further comprise changing the map view from a higher level of abstraction to a more detailed level.

14. The non-transitory, machine-readable medium of claim 13, wherein the more detailed level provides a higher granularity.

15. The non-transitory, machine-readable medium of claim 12, wherein the operations further comprise providing selectable layers in the map view, wherein the selectable layers comprise electrical distribution system graphs, water distribution system graphs, street, road, and highway system graphs, wireless, cable and wired/optical network system graphs, traffic management system graphs, vehicle system graphs, or a combination thereof.

16. The non-transitory, machine-readable medium of claim 12, wherein the operations further comprise combining localized quantum digital twinning models into a composite global model of a wider area of the public safety event.

17. The non-transitory, machine-readable medium of claim 12, wherein the operations further comprise providing a future prediction of a time-lapsed progression of the public safety event from the quantum digital twinning model.

18. The non-transitory, machine-readable medium of claim 12, wherein the analysis is simplified and tailored to a user.

19. The device of claim 1, wherein the quantum processing system comprises a plurality of quantum processors, classical processors, or a combination thereof operating in a distributed computing environment.

20. A method, comprising:
acquiring, in real time, multi-modal sensor data including quantum illumination data, quantum holographic sensor data, and conventional information from distributed sources;
processing the multi-modal sensor data using quantum entanglement-based imaging to generate three-dimensional images with a spatial resolution exceeding a Rayleigh limit, thereby improving an accuracy of object detection and classification in low-visibility or high-noise environments;
storing the three-dimensional images and classified objects as a graph in a quantum graph database, wherein the quantum graph database enables faster retrieval and analysis of spatial relationships between objects compared to classical databases;
creating a quantum digital twinning model of a public safety event based on the multi-modal sensor data and the quantum graph database;
displaying, by a processing system including a quantum processor, a map view of an area, wherein the map view shows images determined by the quantum digital twinning model corresponding to the public safety event, wherein the quantum digital twinning model comprises the three-dimensional images with the classified objects, and wherein the quantum digital twinning model combines the conventional information, the quantum illumination data, the quantum holographic sensor data and quantum object detection;
recommending actions, by the processing system, to mitigate damage of the public safety event, wherein the recommendations are determined from the quantum digital twinning model; and
generating and providing, by the processing system, an analysis explaining how the recommendations were determined by the processing system, wherein the analysis includes a visualization of causal relationships between detected objects and recommended actions generated using quantum-classical federated reinforcement learning, thereby improving user trust and decision-making speed.

* * * * *